R. B. DISBROW.
PUNCTURE PROOF TIRE INSERT.
APPLICATION FILED OCT. 31, 1918.
1,384,243.
Patented July 12, 1921.
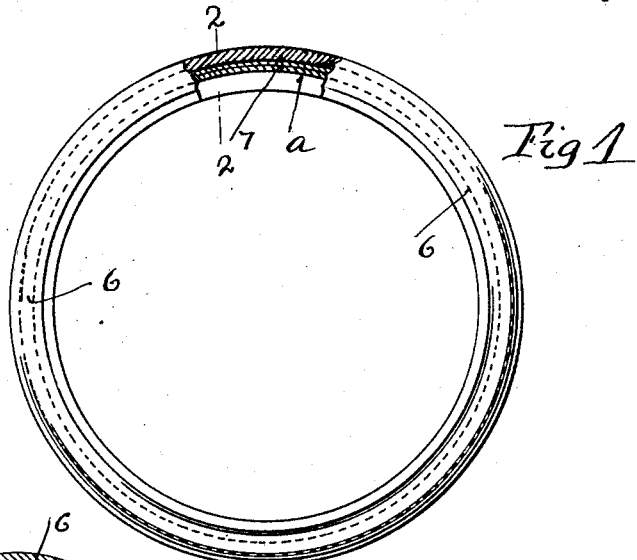
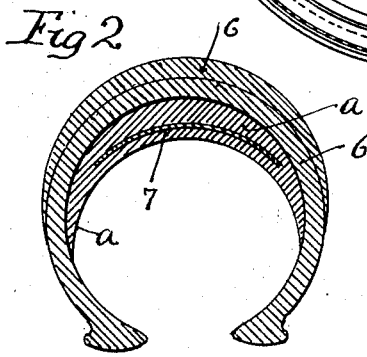
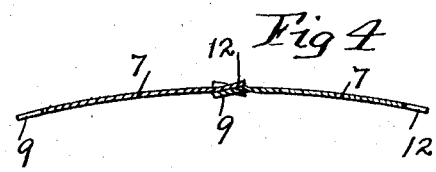
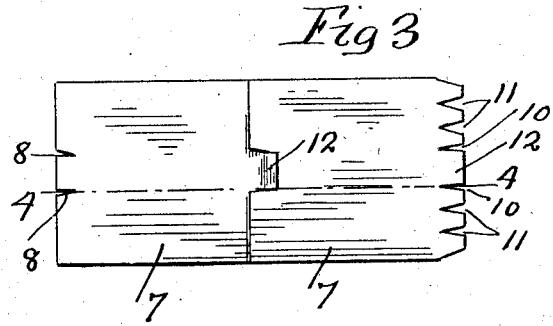
Witnesses
Eva E. König
Bernice G Baumann
Inventor
R. B. Disbrow
By his Attorneys
Williamson Mitchell

UNITED STATES PATENT OFFICE.

REUBEN B. DISBROW, OF ST. PAUL, MINNESOTA.

PUNCTURE-PROOF TIRE-INSERT.

1,384,243.   Specification of Letters Patent.   Patented July 12, 1921.

Application filed October 31, 1918. Serial No. 260,463.

*To all whom it may concern:*

Be it known that I, REUBEN B. DISBROW, a citizen of the United States, residing at St. Paul, in the county of Ramsey and State of Minnesota, have invented certain new and useful Improvements in Puncture-Proof Tire-Inserts; and I do hereby declare the following to be a full, clear, and exact description of the invention, such as will enable others skilled in the art to which it appertains to make and use the same.

My invention has for its object to provide an extremely simple and highly efficient puncture proof casing liner for pneumatic tires; and to such ends, generally stated, the invention consists of the novel construction and combination of parts hereinafter described and defined in the claim.

In accordance with my invention, I provide for the casing of an ordinary pneumatic tire, a separately formed insertible liner made of rubber or a combination of rubber and fabric so that it has the desired flexibility, and inserted in the said liner is a metallic armor made up of sections that are articulated or connected in such manner that they do not destroy the resilience of the tire. This liner has such flexibility that it may be bent for inserting into or removal from the casing. It decreases slightly the inner diameter of the casing, and hence it is advisable to use within the casing a somewhat smaller inner tube than would be employed with the liner removed, but, nevertheless, the larger or oversize inner tube may be employed with the liner inserted.

Preferably, the sections of the liner are made of thin spring tempered sheet steel stamped into slightly cancavo convex form. The ends of these sections are of peculiar and novel formation and are overlapped and flexibly connected in such manner that when the liner is in position within the casing, nails, or the like cannot, under any ordinary circumstances, pass through the casing into the inner tube.

The invention is illustrated in the accompanying drawings wherein like characters indicate like parts throughout the several views. Referring to the drawings:

Figure 1 is a side elevation showing a tire casing having my improved liner applied therein, some parts being sectioned;

Fig. 2 is an enlarged section taken through the tire and liner on the line 2—2 of Fig. 1;

Fig. 3 is a plan view showing two sections of the armor of the liner removed from the liner;

Fig. 4 is a section taken approximately on the line 4—4 of Fig. 3; and

Fig. 5 is a transverse section through one of the armor sections but illustrating a flat form thereof.

The tire casing, which may be of the usual or any suitable construction, is indicated, as an entirety, by the numeral 6. The body of the so-called liner is indicated by the character *a*. This body, as indicated, is very flexible. Preferably, it will be made of soft rubber but may be reinforced with canvas, or, in other words it may be made a good deal on the plan of a tire casing, although it is advisably made more pliable and of a rubber of more spongy character, and this, for two reasons, to wit, that the liner may be easily inserted within the casing and removed therefrom, and when applied in the casing, will increase the resilience thereof.

Embedded within this liner *a*, preferably being cast therein in the process of forming said liner, is the puncture proof tire armor made up of a plurality of circumferentially extended sheet steel sections 7 having overlapped edges. The overlapped edges of these armor sections 7 are preferably constructed substantially as follows:

At one end, each section is formed with at least two slits 8 that form a hinged tongue between them; and at its other edge, said section is formed with a plurality of slits 10 and 11, a central hinged tongue 12 being formed between the slits 10. When the two sections are put together, as shown in Figs. 3 and 4, the tongue 12 of the one section is inserted into the notch formed between the slits 8 of the abutting section and will be on the outer side of the armor while the tongue 9 will be inserted in the notch between the slits 10 and will be on the inner side of the armor (see particularly Figs. 3 and 4). The tongues between the slits 10 and 11 will be overlapped by the wide tongues that are formed outward of the tongue 9 on the adjacent section. This gives a lap joint between the sections and at the same time, gives a decided flexibility to the endless, or complete armor, and moreover, the interlocking engagement described will hold the sections of the armor against lateral movements or displacement.

Preferably, the sections of the armor are made concavo convex in cross section, as best shown in Fig. 2, but the sections may be flat, as shown in Fig. 5. The armor or puncture-proof insert described may be applied within a tire casing in the process of making the same, at comparatively small cost and will obviate nearly or all of the annoyance covered by punctures.

Preferably, the casing liner, so-called, is an endless annular band that is crescent shaped in cross section. It might be made in sections or have split ends, but such construction would not be as good as the endless structure, because it would not give as good a surface for contact with the inner tube of the tire.

What I claim is:

A casing liner for pneumatic tires having embedded therein an articulated puncture proof insert made up of thin metal sections disposed end to end around the liner, said sections being formed at their ends with longitudinal slits forming central tongues therebetween, the sections being arranged with their ends overlapping and with the central tongue of one section on the opposite side of the adjacent section from the portions at the sides of said tongue.

In testimony whereof I affix my signature in presence of two witnesses.

REUBEN B. DISBROW.

Witnesses:
 CLARA DEMAREST,
 F. D. MERCHANT.